US006801443B2

(12) United States Patent
Manthe

(10) Patent No.: US 6,801,443 B2
(45) Date of Patent: Oct. 5, 2004

(54) POWER SUPPLY WITH SNUBBER CIRCUIT

(75) Inventor: Alan Manthe, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/300,211

(22) Filed: Nov. 19, 2002

(65) Prior Publication Data
US 2004/0095788 A1 May 20, 2004

(51) Int. Cl.$^7$ .............................................. H02H 7/122
(52) U.S. Cl. .............. 363/56.12; 219/668; 219/137 PS
(58) Field of Search ................... 363/55, 56.01, 363/56.02, 56.12; 361/91.7; 219/660, 661, 663, 668, 137 PS

(56) References Cited

U.S. PATENT DOCUMENTS

| 4,286,314 A | * | 8/1981 | Molyneux-Berry | .......... 363/55 |
| 4,849,873 A | * | 7/1989 | Vanderhelst | ................. 363/55 |
| 5,260,607 A | * | 11/1993 | Kinbara | ....................... 327/427 |
| 5,986,904 A | * | 11/1999 | Jacobs et al. | ................. 363/53 |

OTHER PUBLICATIONS

Maxstar® 200 SD, DX, And LX Owner's Manual Miller® The Power of Blue Oct. 2001.
Maxstar® 200 STR Owner's Manual Miller® The Power of Blue Oct. 2001.

* cited by examiner

Primary Examiner—Michael Sherry
Assistant Examiner—Gary L. Laxton
(74) Attorney, Agent, or Firm—George R. Corrigan

(57) ABSTRACT

A method and apparatus for providing welding-type power supply is disclosed. It includes an inverter power circuit, a bus inductor, a snubber circuit a snubber capacitor voltage feedback circuit, and a control circuit. The inverter circuit includes a bus, switches, and an output. The bus inductor is connected to the inverter and the bus. The snubber circuit is connected to the switches. Also, the snubber circuit includes a snubber inductor, a snubber capacitor, a recovery switch connected to the snubber inductor and the snubber capacitor. At least one freewheeling circuit includes the snubber inductor and at least one freewheeling switch. The snubber capacitor voltage feedback circuit is connected to the snubber capacitor and provides a snubber capacitor voltage feedback output to the control circuit. The control circuit includes a comparison circuit that compares the snubber capacitor voltage feedback and a threshold. The output of the comparison controls the recovery switch.

22 Claims, 2 Drawing Sheets

POWER SUPPLY WITH SNUBBER CIRCUIT

FIELD OF THE INVENTION

The present invention relates generally to the art of welding-type power supplies. More specifically, it relates to welding-type power supplies having a snubber that recovers energy.

BACKGROUND OF THE INVENTION

There are many power supplies that produce welding-type power, having a variety of configurations and uses. Welding-type power supply, as used herein, includes power supplies that provide welding-type power. Welding type power, as used herein, refers to welding, plasma or heating power.

TIG welding is one well known welding process, and is often performed using a switched power supply, such as a Miller MaxStar 200®. Switched welding-type power supplies are made with a variety of power topologies and control schemes. Most include a snubber circuit for the switches, that serves to protect switches, such as from voltage spikes.

One disadvantage of snubber circuits is that they tend to increase losses and heating. Accordingly, it is desirable to provide a welding-type power supply that includes a snubber circuit that recovers energy that would otherwise not be utilized.

SUMMARY OF THE PRESENT INVENTION

According to a first aspect of the invention a welding-type power supply includes an inverter power circuit, a bus inductor, a snubber circuit, a snubber capacitor voltage feedback circuit, and a control circuit. The inverter circuit includes a bus, a plurality of switches, and an output. The bus inductor is connected to the inverter and the bus. The snubber circuit is connected to the plurality of switches. Also, the snubber circuit includes a snubber inductor, an isolating diode, a recovery switch connected to the snubber inductor and the snubber capacitor. At least one freewheeling circuit includes the snubber inductor and at least one freewheeling switch. The snubber capacitor voltage feedback circuit is connected to the snubber capacitor and provides a snubber capacitor voltage feedback output to the control circuit. The control circuit includes a comparison circuit that compares the snubber capacitor voltage feedback and a threshold. The output of the comparison controls the recovery switch.

According to a second aspect of the invention a welding-type power supply includes an inverter means for inverting a bus and for providing output power on an output. A snubber means for snubbing the plurality of switches including means for storing and recovering energy, means for opening and closing a current path including the means for storing. The snubber means also includes means for enabling a freewheeling current path that includes the means for storing. Feedback means for providing a signal indicative of a snubber capacitor voltage is connected to the snubber capacitor and a means for controlling the snubber, particularly opening and closing the current path.

According to a third aspect of the invention a welding-type power supply for providing welding-type power includes an inverting means for inverting a bus to provide an output and stabilizing means for stabilizing the bus and the output. A snubber means for snubbing the inverter includes means for recovering energy when a snubber capacitor voltage exceeds a threshold, and means for freewheeling current when the recovery switch is turned off.

A method of providing welding-type power includes inverting a bus to provide an output, stabilizing the bus and the output and snubbing the inverter. Snubbing includes recovering energy when a snubber capacitor voltage exceeds a threshold and freewheeling current when the recovery switch is turned off.

According to one embodiment the recovery switch, snubber capacitor, at least one of the plurality of switches, the load or output, and the snubber inductor form a current path. Also, the freewheeling circuit includes the snubber inductor, the at least one freewheeling switch, the output, and at least one of the plurality of switches.

The inverter is an H-bridge having two current paths in another alternative. The plurality of switches includes at least four switches, and the at least one freewheeling switch includes two freewheeling switches, each associated with one of the H-bridge current paths.

The two freewheeling switches are SCRs and/or the recovery switch is an IGBT in various embodiments.

The welding-type power supply also includes at least one capacitance circuit connected across the bus, and in parallel with the inverter power circuit. A transformer secondary and rectifier is in series with the bus inductor, and the series combination is also in parallel with the capacitance circuit in an alternative.

A diode is disposed between the snubber capacitor and a rail of the bus in yet another alternative.

Other principal features and advantages of the invention will become apparent to those skilled in the art upon review of the following drawings, the detailed description and the appended claims.

Figure 1:
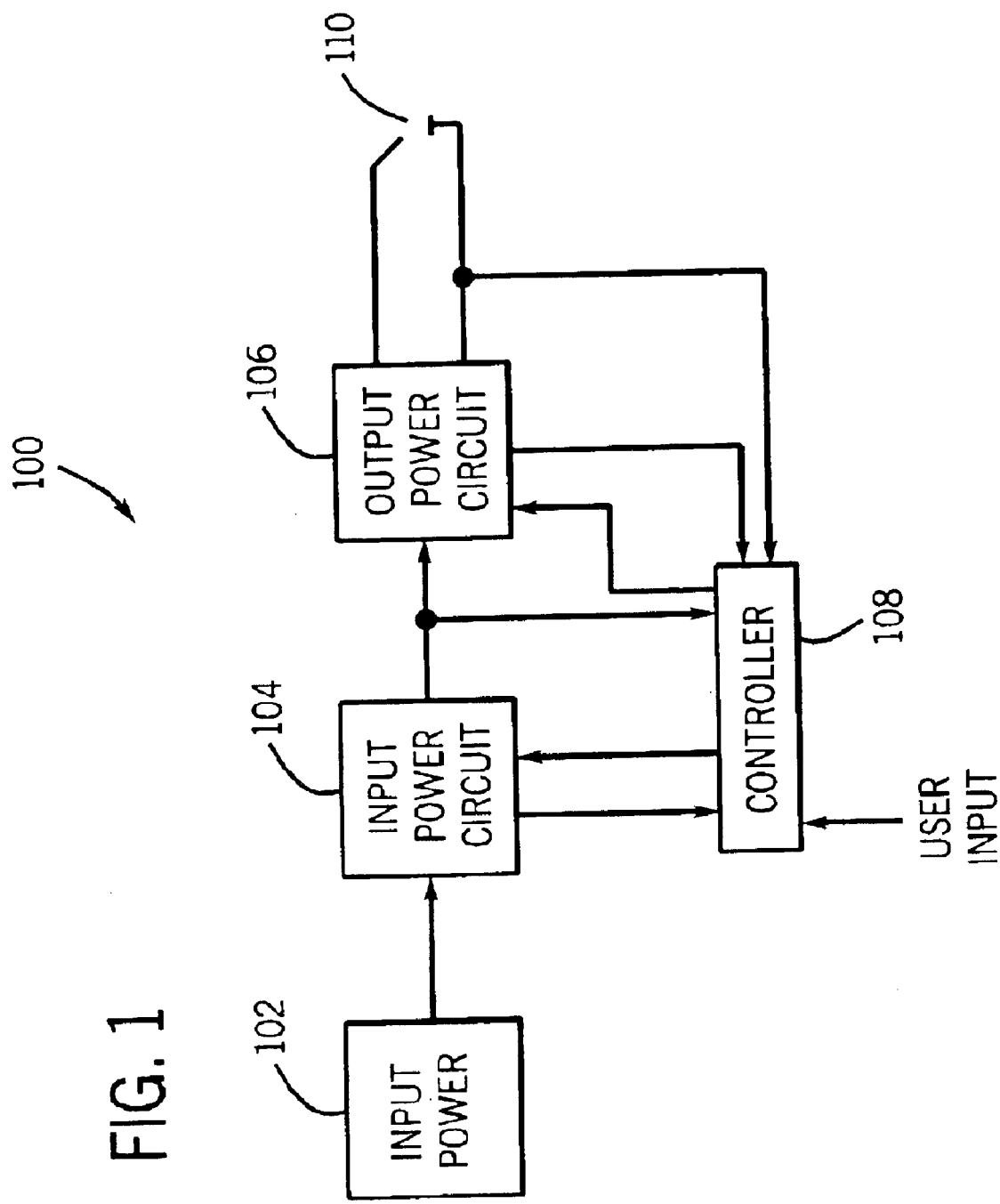
FIG. 1 is a block diagram of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to TIG welding and a particular power circuit and control scheme, it should be understood at the outset that the invention can also be implemented with other topologies, circuits and control schemes, and used for other applications.

Generally, the invention provides for a switched welding-type power supply with a snubber circuit that recovers energy. Specifically, the preferred embodiment provides that an inverter based welding-type power supply include a snubber circuit that recovers energy from the snubber capacitor when the snubber capacitor voltage exceeds a predetermined voltage (300 volts in one embodiment). The energy is recovered using a snubber inductor (i.e. an inductor that forms part of the snubber circuit) in series with a switch. When the switch is on, it completes a circuit including the snubber inductor, the switch, a snubber capacitor (i.e., a capacitor that is part of the snubber circuit), the "ON" leg of the inverter bridge, and the output.

The switch is turned on when the snubber capacitor voltage exceeds the threshold, and turned off when the voltage drops below the threshold, or another threshold (in the preferred embodiment hysteresis in the comparator circuit provides two thresholds). While the switch is on, current flows through the inductor, recovering energy from the snubber capacitor. When the switch is turned off, energy stored in the inductor is returned to the output through a freewheeling path (until the energy is recovered).

Referring now to FIG. 1, a welding-type power supply 100 in accordance with the present invention receives input power from an ac source 102 (a dc source may be used in other embodiments) that is provided to an input power circuit 104. (Circuit, as used herein, includes analog and/or digital components, power or control elements, and/or a microprocessor or a portion thereof.) Input power circuit 104 is preferably consistent with the prior art and includes a rectifier, a half bridge inverter, a transformer and a rectifier. The input is rectified, inverted, transformed and rectified to produce a dc bus.

Other embodiments provide for an input power circuit that includes a pre-regulator that receives ac or dc, and provides the bus, or transforms the input signal.

The bus may be created using any method, and is provided to an output power circuit 106, which includes an inverter in the preferred embodiment. A controller 108 controls output power circuit 106 (and other controllable stages as needed) to provide welding-type power to an arc 110. The specific manner in which controller (or control circuit) 108 controls output power circuit 108 to provide a user-selected output is preferably consistent with the prior art, but any general control scheme can be used. (The control specific to the snubber will be described below). The magnitude of the output current is controlled using PWM of the input power circuit half-bridge, in a manner known in the prior art, using current feedback from a LEM, and a user setpoint, e.g.

Figure 2:
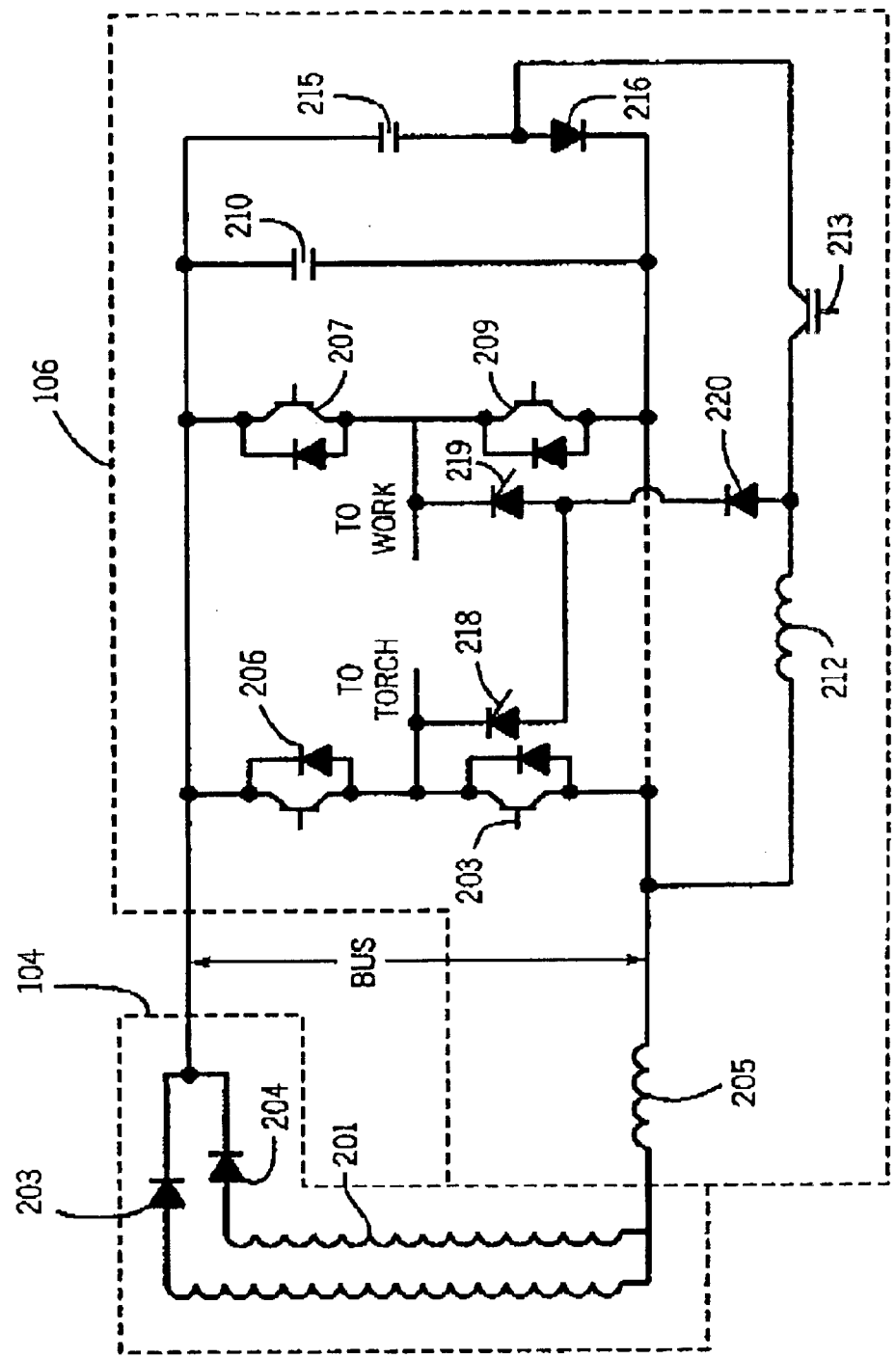
FIG. 2 is a circuit diagram of an output inverter with a snubber circuit in accordance with the present invention.

A circuit diagram of one embodiment of transformer/rectifier 104 and output power circuit 106 is shown in FIG. 2. Transformer/rectifier 104 includes a primary (not shown), a secondary 201 and rectifying diodes 203 and 204. An output stabilizer 205 stabilizes (helps maintain an arc current) the output, particularly during polarity transitions with an ac output. These elements cooperate in a manner well known in the art to produce a dc bus that is provided to Power output circuit 106.

Power output circuit 106 includes, consistent with the prior art, a full H bridge inverter, including switches 206, 207, 208 and 209. A capacitor 210 (2.2 $\mu$F in the preferred embodiment) creates a low impedance source to re-establish a welding arc after a polarity change on the output. Other embodiments include using a half-bridge or other topologies, including other capacitance circuits, such as split capacitors, parallel capacitor, etc., which are included in the term capacitor.

The inverter is controlled in a manner known in the art, and an alternating current output is provided by turning on and off switches 206–209 in diagonal pairs. For example, when switches 206 and 209 are on, current flows from the torch to the workpiece. To reverse the current flow, switches 206 and 209 are turned off, and switches 207 and 208 are turned on. The switches are thus alternately turned on and off to create an ac output. A DC output of a given polarity may be provided by turning on only one of the pairs of switches.

A snubber circuit is connected to the inverter and includes a snubber inductor 212 a recovery switch 213, a snubber capacitor 215 (2.2 $\mu$F in the preferred embodiment), a diode 216, and a pair of steering SCRs 218 and 219, in accordance with the present invention. The operation thereof will be described shortly. Connected to, as used herein, includes a direct or indirect electrical or functional connection.

Inverter switches 206–209 are timed such that as two go off, there is a brief (3–5 $\mu$sec for example) delay before the other pair is turned on. During this time bus inductor 205 (i.e., the inductor that stabilizes the output) and other system inductances cause a voltage spike to be created on the bus. This spike can adversely effect switches 206–209, and is snubbed (controlled or reduced) by the snubber circuit. Moreover, in accordance with the invention, the energy is recovered and provided to the load.

Specifically, when the voltage on the snubber capacitor exceeds a threshold (preferably 300 volts) recovery switch 213 is closed. When recovery switch 213 is closed, and either inverter pair is closed, a current path including the bus, the closed inverter switches, the load, inductor 212 and snubber capacitor 215 is closed (or enabled). Thus, current begins to flow in snubber inductor 212.

When the snubber capacitor voltage decreases below 300 volts, switch 213 is opened, disabling the current path. The current flowing through inductor 212 then flows through one of steering or freewheeling SCRs 218 and 219 (other unidirectional switches may be used), so that the current from inductor 212 is provided across the load. SCRs and a diode 220 are used so that current does not freewheel without going through the load. Thus, SCR 218 is associated with the switches 206 and 209 current path, and SCR 219 is associated with the switches 207–208 current path. Other switch types are used in alternative embodiments. Switch, as used herein, includes a device that at a minium enables a current path.

Controller 108 (FIG. 1) receives voltage and current feedback. The current feedback is used to control the PWM of input power circuit 104, and voltage feedback is used to control recovery switch 213. (Other control functions use these or other feedback parameters). Preferably, controller 108 includes a comparison circuit that compares a voltage feedback signal (or a function thereof, such as dv/dt, V*V, the integral of V, etc.) to a signal representative of a threshold. The threshold may be factory or user set, or change with the process. The various control aspects may be dependent or independent of one another. they may be controlled by a single or multiple controllers, on one or more boards.

Comparison circuit, as used herein, includes any digital, analog, or other circuit that compares two or more values. Controller, or control circuit, as used herein, includes digital and analog circuitry, discrete or integrated circuitry, microprocessors, DSPs, etc., and software, hardware and firmware, located on one or more boards, used to control a device such as a power supply.

The invention may be implemented using the snubber circuit in other topologies, other stages of a welding-type power supply, or in other applications.

Numerous modifications may be made to the present invention which still fall within the intended scope hereof.

Thus, it should be apparent that there has been provided in accordance with the present invention a method and apparatus for a welding-type power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type power supply, comprising:
   an inverter power circuit, including a bus, a plurality of switches, and a power output;
   a bus inductor, connected to the inverter and the bus;
   a snubber circuit connected to the plurality of switches, including
      a snubber inductor,
      a snubber capacitor,
      a recovery switch connected to the snubber inductor and the snubber capacitor, and having a recovery switch control input, and
      at least one freewheeling circuit including the snubber inductor and at least one freewheeling switch;
   a snubber capacitor voltage feedback circuit, connected to the snubber capacitor and having a snubber capacitor voltage feedback output responsive to a snubber capacitor voltage; and
   a control circuit, including a comparison circuit having as an input the snubber capacitor voltage feedback output, and having as a control output a control signal connected to the recovery switch control input.

2. The welding-type power supply of claim 1, wherein the recovery switch, the snubber capacitor, at least one of the plurality of switches, the power output, and the snubber inductor form a current path, and further wherein the freewheeling circuit includes the snubber inductor, the at least one freewheeling switch, the power output, and at least one of the plurality of switches.

3. The welding-type power supply of claim 2, wherein the inverter is an H-bridge having two current paths, the plurality of switches includes at least four switches, and the at least one freewheeling switch includes two freewheeling switches, each associated with one of the current paths.

4. The welding-type power supply of claim 3, wherein the two freewheeling switches are uni-directional switches.

5. The welding-type power supply of claim 3, further comprising at least one capacitance circuit connected across the bus, in parallel with the inverter power circuit, and a transformer secondary and rectifier in series with the bus inductor, wherein the series combination is in parallel with the capacitance circuit.

6. The welding-type power supply of claim 5, further a diode disposed between the snubber capacitor and a rail of the bus.

7. The welding-type power supply of claim 3, wherein the recovery switch is an IGET.

8. A method of providing welding-type power, comprising:
   inverting a bus to provide an output;
   stabilizing the bus and the output; and
   snubbing the inverter, including recovering energy when a snubber capacitor voltage exceeds a threshold by forming a current path including a snubber inductor, a recovery switch, a snubber capacitor, the output, and at least one of a plurality of inverter switches, and freewheeling current when a recovery switch is turned off.

9. The method of claim 8, further comprising transforming and rectifying an ac signal to create the bus voltage.

10. A method of providing welding-type power, comprising:
    inverting a bus to provide an output;
    stabilizing the bus, and the output; and
    snubbing the inverter, including recovering energy when a snubber capacitor voltage exceeds a threshold and freewheeling current when a recovery switch is turned off;
    wherein recovering includes turning a switch on, wherein the switch a snubber capacitor, at least one of a plurality of inverter switches, the output, and a snubber inductor form a current path, and further wherein freewheeling includes turning on at least one of a plurality of freewheeling switches, and further wherein a freewheeling current path includes the snubber inductor, the at least one freewheeling switch, the output, and at least one of a plurality of inverter switches.

11. The method of claim 10, wherein inverting includes inverting an H-bridge having two current paths and at least four switches, and further wherein the at least one freewheeling switch includes two freewheeling switches, each associated with one of the current paths.

12. A welding-type power supply, comprising:
    inverter means for inverting a bus and providing output power on an output;
    snubber means for snubbing a plurality of switches in the inverter means, including
       means for storing and recovering energy,
       means for enabling and disabling a current path that includes the means for storing, connected to the means for storing, and
       means for enabling a freewheeling current path that includes the means for storing;
    feedback means for providing a signal indicative of a snubber capacitor voltage, connected to a snubber capacitor; and
    means for controlling the means for enabling and disabling a current path and the means for enabling a freewheeling current in response to the signal.

13. The welding-type power supply of claim 12, wherein the means for inverting includes a plurality of switches, and further wherein the means for storing, part of the means for inverting, and the means for enabling and disabling form a current path, and further wherein the freewheeling current path includes the means for storing, at least one freewheeling switch, the output, and the part of the means for inverting.

14. The welding-type power supply of claim 13, wherein the means for inverting is an H-bridge having two current paths, the plurality of switches includes at least four switches, and the at least one freewheeling switch includes two freewheeling switches, each associated with one of the current paths.

15. The welding-type power supply of claim 14, wherein the two freewheeling switches are SCRs.

16. The welding-type power supply of claim 15, further comprising at least one means for storing energy, connected across the bus, and in parallel with the inverter means, and further comprising a transformer secondary and rectifier in series with a bus inductor, wherein the series combination is in parallel with the at least one means for storing.

17. The welding-type power supply of claim 16, wherein the means for storing and recovering, the means for enabling and disabling, and at least two of the plurality of switches form a current path.

18. The welding-type power supply of claim 17, wherein the means for enabling and disabling is an IGBT.

19. A welding-type power supply for providing welding-type power, comprising:

inverting means for inverting a bus to provide an output;

stabilizing means for stabilizing the bus and the output; and snubber means for snubbing the inverter, including means for recovering energy when a snubber capacitor voltage exceeds a threshold, and further including means for freewheeling current when a recovery switch turns off;

wherein the means for recovering includes a switch means for enabling and disabling a current path that includes a snubber inductor, a snubber capacitor and part of the inverting means, and further wherein the means for freewheeling includes at least one of a plurality of freewheeling switches, wherein a freewheeling current path includes the snubber inductor, the at least one freewheeling switch, the output, and at least one of a plurality of inverter switches.

20. The welding-type power supply of claim 19, wherein the inverting means includes inverting an H-bridge having two current paths and at least four switches, and further wherein the at least one freewheeling switch includes two freewheeling switches, each associated with one of the current paths.

21. The welding-type power supply of claim 20, further comprising means for transforming and rectifying an ac signal to create the bus voltage.

22. A welding-type power supply for providing welding-type power, comprising:

inverting means for inverting a bus to provide an output;

stabilizing means for stabilizing the bus and the output; and snubber means for snubbing the inverter, including means for recovering energy when a snubber capacitor voltage exceeds a threshold, and further including means for freewheeling current when a recovery switch turns off;

wherein the means for recovering includes a current path including a snubber inductor, a snubber capacitor, a recovery switch, the output, and at least two inverter switches.

* * * * *